(12) United States Patent
Choi et al.

(10) Patent No.: US 11,919,375 B2
(45) Date of Patent: Mar. 5, 2024

(54) VEHICLE DOOR COUPLING DEVICE

(71) Applicant: KWANGJIN CO., LTD., Asan-si (KR)

(72) Inventors: Jung Woo Choi, Gyeongju-si (KR);
Kwan Yong Lee, Yongin-si (KR)

(73) Assignee: KWANGJIN CO., LTD., Asan-si (KR)

( * ) Notice: Subject to any disclaimer, the term of this patent is extended or adjusted under 35 U.S.C. 154(b) by 324 days.

(21) Appl. No.: 17/422,634

(22) PCT Filed: Apr. 2, 2020

(86) PCT No.: PCT/KR2020/004519
§ 371 (c)(1),
(2) Date: Jul. 13, 2021

(87) PCT Pub. No.: WO2020/204629
PCT Pub. Date: Oct. 8, 2020

(65) Prior Publication Data
US 2022/0089006 A1  Mar. 24, 2022

(30) Foreign Application Priority Data

Apr. 3, 2019  (KR) .......................... 10-2019-0039103

(51) Int. Cl.
*F16B 21/02* (2006.01)
*B60J 5/04* (2006.01)

(52) U.S. Cl.
CPC .......... *B60J 5/0468* (2013.01); *B60J 5/0413* (2013.01); *B60J 5/0416* (2013.01); *F16B 21/02* (2013.01); *B60Y 2304/07* (2013.01)

(58) Field of Classification Search
CPC .. F16B 21/02; F16B 21/04; F16B 5/10; F16B 5/0208; F16B 41/002
(Continued)

(56) References Cited

U.S. PATENT DOCUMENTS 2,858,156 A * 10/1958 Wootton ............... F16B 43/001
384/138
2,922,211 A *  1/1960 Boyd ........................ F16B 5/10
411/929
(Continued)

FOREIGN PATENT DOCUMENTS

FR          3058484 A1    5/2018
JP      2015-083851 A    4/2015
(Continued)

OTHER PUBLICATIONS

E.C. Verkerk, "European Search Report for EP Application No. 20784465.5", EPO, Germany.

*Primary Examiner* — Flemming Saether
(74) *Attorney, Agent, or Firm* — Bridgeway IP Law Group, PLLC; Jihun Kim (57) ABSTRACT

The present disclosure relates to a vehicle door coupling device, and more specifically, to a vehicle door coupling device for mechanically coupling together a first member having a first hole and a second member having a second hole at a position corresponding to the first hole. The vehicle door coupling device includes: a stopper configured to support the first member; and a shaft including a crossbar configured to support the second member and couple the second member to the first member when the shaft is rotated to a final coupling position, and a hook portion configured to cause the shaft to be caught on the first member in a temporary coupling position, the shaft being connected to support the stopper and the crossbar, wherein the shaft is shaped such that the shaft is inserted into the first hole of the first member and the second hole of the second member and rotatably passes therethrough, and an material for airtight is (Continued)

provided on the shaft to maintain airtightness between the shaft and the first hole of the first member in the final coupling position.

6 Claims, 12 Drawing Sheets

(58) Field of Classification Search
USPC .............................. 411/349, 549, 353, 999
See application file for complete search history.

(56) References Cited

U.S. PATENT DOCUMENTS

| | | | |
|---|---|---|---|
| 4,911,726 A * | 3/1990 | Warkentin | F16B 21/02 81/176.15 |
| 5,399,053 A * | 3/1995 | Duran | F16B 21/18 411/105 |
| 6,860,689 B1 * | 3/2005 | Attanasio | B64C 1/12 411/353 |
| 8,939,691 B2 * | 1/2015 | Tseng | F16B 21/04 411/347 |
| 10,266,994 B2 * | 4/2019 | McDowell | F16B 5/0642 |
| 10,933,817 B2 * | 3/2021 | Leverger | F16B 21/04 |
| 10,968,938 B2 * | 4/2021 | Leidig | F16B 21/04 |
| 2013/0076019 A1 | 3/2013 | Takemoto | |
| 2019/0118731 A1 | 4/2019 | Leverger et al. | |
| 2022/0243753 A1 * | 8/2022 | Wang | F16B 21/04 |

FOREIGN PATENT DOCUMENTS

| | | |
|---|---|---|
| KR | 20-0168232 Y1 | 3/2000 |
| KR | 10-2003-0031405 A | 4/2003 |
| KR | 10-1964413 B1 | 4/2019 |

* cited by examiner

VEHICLE DOOR COUPLING DEVICE

TECHNICAL FIELD

The present disclosure relates to a vehicle door coupling device, and more particularly, to a vehicle door coupling device for mechanically coupling first and second members of an automobile door to each other in a stable and airtight manner.

BACKGROUND ART

In recent automobile assembly processes, the trend of modularization for combining and assembling unit components has increased to reduce assembly lines and improve workability and thus to improve productivity. Due to this trend, doors are also assembled by collecting components such as a door window regulator, a door latch, and a door inside handle into a modular panel, and then coupling the modular panel to a door inner panel.

Figure 1:
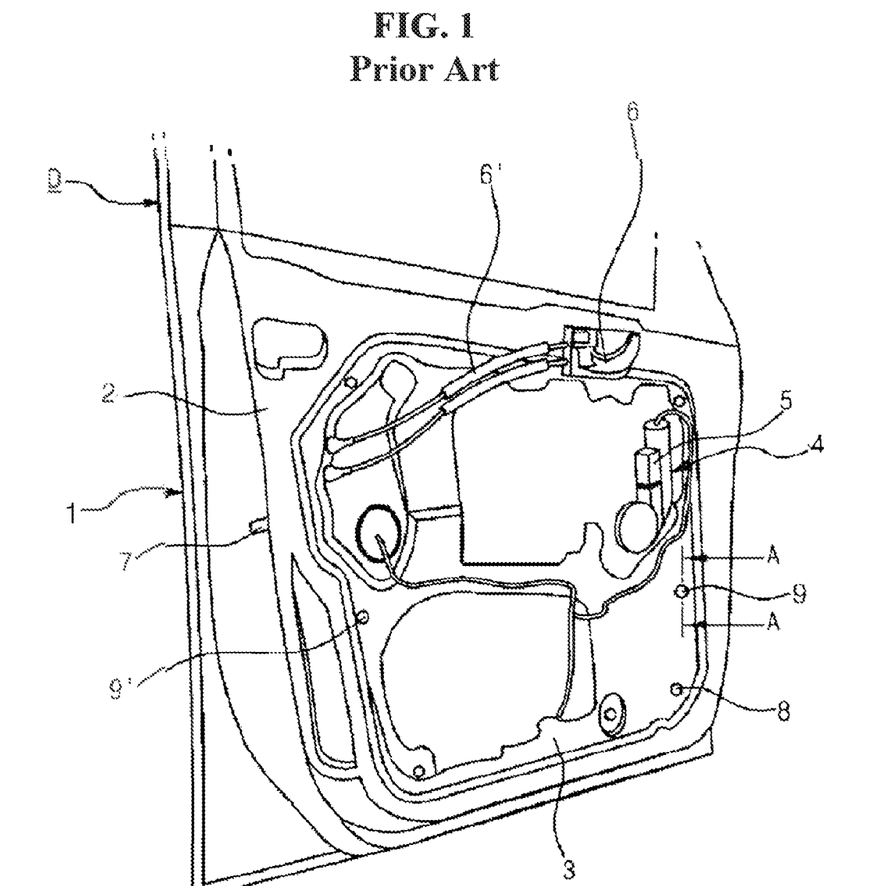
FIG. 1 is a perspective view illustrating a vehicle door coupling device of the related art.
Figure 2:
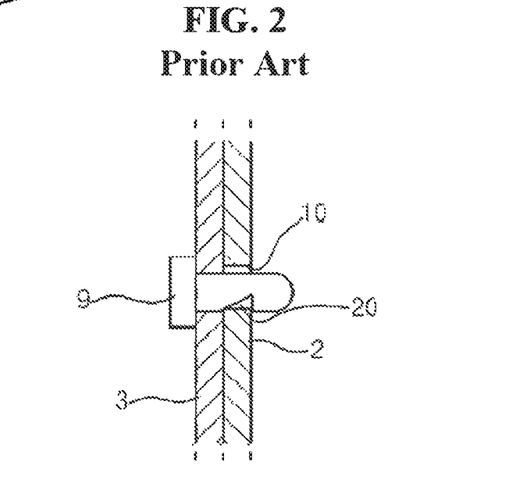
FIG. 2 is a cross-sectional view of FIG. 1.
Figure 3:
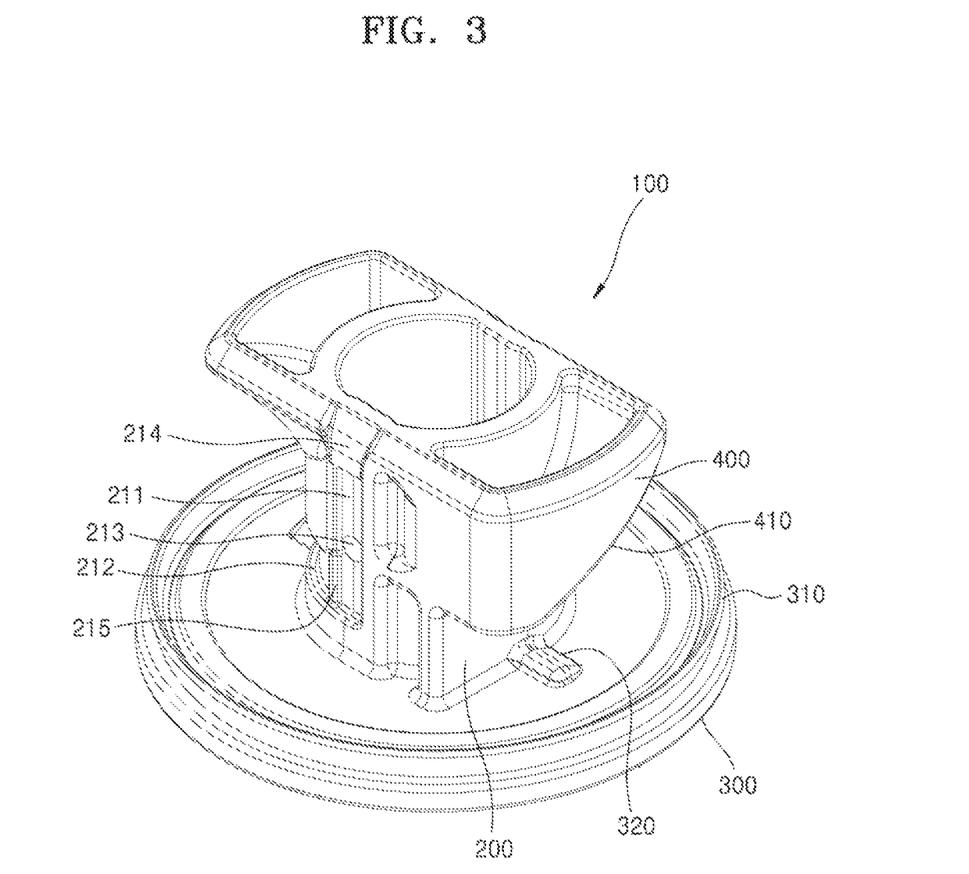
FIG. 3 is a perspective view illustrating a structure of a vehicle door coupling device of the present disclosure.

As shown in FIGS. 1 and 2, a door module of the related art is assembled as follows: a door panel 1 of a door D is assembled by joining together both lateral sides and lower ends of a door outer panel and a door inner panel 2 with a cavity being formed therein; a regulator motor 5 of a door window regulator 4 is coupled to the outer surface of a door modular panel 3; a regulator channel (not shown) is coupled to the inner surface of the door modular panel 3; a door inside handle 6 is coupled to the upper outer surface of the modular panel 3; an end of a cable 6' is connected to the door inside handle 6; the other end of the cable 6' is laterally guided and connected to a door latch 7; other necessary cables are installed; the regulator channel and the door latch 7 are inserted into the cavity formed in the door panel 1 while moving the modular panel 3 close to the door inner panel 2; and the door modular panel 3 is attached to the door inner panel 2 by using bolts 8 at at least 4 positions.

In general, when attaching the modular panel 3 to the door inner panel 2 with the bolts 8 as described above, the modular panel 3 is attached to the door inner panel 2 while moving the door panel 1 and maintaining the door panel 1 at a vertical posture using a jig, and thus, a temporary assembling means is used to quickly align the bolts 8 with fastening holes. The temporary assembly means is to fix support pins 9 and 9' to both sides of the door modular panel 3, form support holes 10 in the door inner panel 2 at positions corresponding to the support pins 9 and 9', insert the bolts 8 into the support holes 10, and fasten the bolts 8.

However, the fastening and coupling process of the related art is inconvenient and disadvantageous, for example, because it is necessary to prepare the support pins 9 and 9' separately from the bolts 8 so as for temporary fixation and additionally fasten the bolts 8 after temporarily fixing the support pins 9 and 9'.

In addition, because the support pins 9 and 9' for temporary fixation and the bolts 8 have to be directly inserted into holes at the site of assembly, the overall work time increases.

In addition, because workspaces where bolts are fastened are usually narrow and small, it is not easy to correct insert support pins and bolts into given positions, thereby increasing inconvenience during work.

DESCRIPTION OF EMBODIMENTS

Technical Problem

The present disclosure is provided to solve the above-mentioned problems, and more particularly, the technical objective of the present disclosure is to provide a vehicle door coupling device for easily coupling a modular panel and a door inner panel to each other in a shorter work time while guaranteeing airtightness.

Solution to Problem

To achieve the above-mentioned objectives, the present disclosure provides a vehicle door coupling device for mechanically coupling together a first member having a first hole inside which an engaging protrusion is provided and a second member having a second hole at a position corresponding to the first hole, the vehicle door coupling device including:

a shaft shaped to be fitted into the first hole of the first member and the second hole of the second member and rotatably pass therethrough, the shaft extending in a vertical direction;

a stopper provided on a side of the shaft and configured to support the first member;

a crossbar provided on another side of the shaft and configured such that when the shaft is rotated to a final coupling position, the crossbar fixedly couples the second member to the first member while supporting the second member; and a position maintaining structure provided on the shaft, the position maintaining structure being configured to allow the shaft to be temporarily coupled to the first member in a temporary coupling position in a state in which the shaft is vertically movable without being separated from the first member and being configured to maintain a state in which a rear side of the crossbar partially protrudes from the second member in the temporary coupling position.

In the vehicle door coupling device,
the position maintaining structure may include:
a vertical groove portion which is provided in an outer side of the shaft, extends in the vertical direction toward the side of the shaft from the other side of the shaft, and is configured to receive the engaging protrusion therein and guide the engaging protrusion; and a horizontal groove portion which extends in a horizontal direction from an end of the vertical groove portion and is configured to allow rotation of the shaft, wherein a position maintaining protrusion may be provided in the vertical groove portion to prevent the engaging protrusion of the first hole from entering the horizontal groove portion in the temporary coupling position.

In the vehicle door coupling device,
the position maintaining protrusion may be provided on a portion through which the vertical groove portion and the horizontal groove portion are connected to each other.

In the vehicle door coupling device,
a separation-preventing protrusion may be provided on an entrance of the vertical groove portion to prevent separation of the engaging protrusion inserted into the vertical groove portion, and the engaging protrusion may allow the shaft to move upward or downward in the temporary coupling position while the engaging protrusion vertically moves between the separation-preventing protrusion and the position maintaining protrusion.

In the vehicle door coupling device,
a rotation-suppressing protrusion may be provided in the horizontal groove portion to suppress rotation of the shaft such that unless a force equal to or greater than a given value is applied to the shaft, rotation of the shaft along the horizontal groove portion may be suppressed.

In the vehicle door coupling device, the stopper of the shaft may have a rear side facing the first member, and a sealing material may be provided on the rear side to guarantee watertightness when the stopper is brought into contact with the first member.

In the vehicle door coupling device, an anti-loosening structure may be provided on the stopper of the shaft to prevent loosening when the shaft is rotated to the final coupling position.

Advantageous Effects of Disclosure

The vehicle door coupling device of the present disclosure is configured to be easily fitted into and fixed to a door inner panel in a state in which the vehicle door coupling device is temporarily fitted into a door modular panel, and thus the door modular panel and the door inner panel may be easily coupled to each other using the vehicle door coupling device.

In addition, according to the present disclosure, the crossbar of the vehicle door coupling device partially protrudes from the rear side of the modular panel, and thus, the crossbar does not act as a significant obstacle when the modular panel is attached to the door indoor panel.

In addition, according to the present disclosure, the position maintaining protrusion is provided between the vertical groove portion and the horizontal groove portion of the shaft, and thus, relative rotation of the shaft may be prevented until the shaft is fully inserted.

In addition, according to the present disclosure, the anti-loosening structure is provided to prevent loosening in the final coupling position, and thus, coupling may be securely maintained.

In addition, according to the present disclosure, the sealing material is provided on a side of the stopper which faces the door modular panel, and thus, watertightness may be guaranteed.

MODE OF DISCLOSURE

Hereinafter, a vehicle door coupling device will be described in detail with reference to the accompanying drawings according to embodiments of the present disclosure.

A vehicle door coupling device 100 of the present disclosure is for mechanically coupling together a first member 500 having a first hole 501 and a second member 600 having a second hole 601 at a position corresponding to the first hole 501.

Specifically, the first member 500 having the first hole 501 corresponds to a door modular panel. Electric components necessary for a door of an automobile are modularized and installed on the door modular panel, and for example, components such as a window regulator and a speaker may be installed on the door modular panel. After given electric components are installed on the door modular panel, the door modular panel is attached to a door inner panel.

Figure 5:
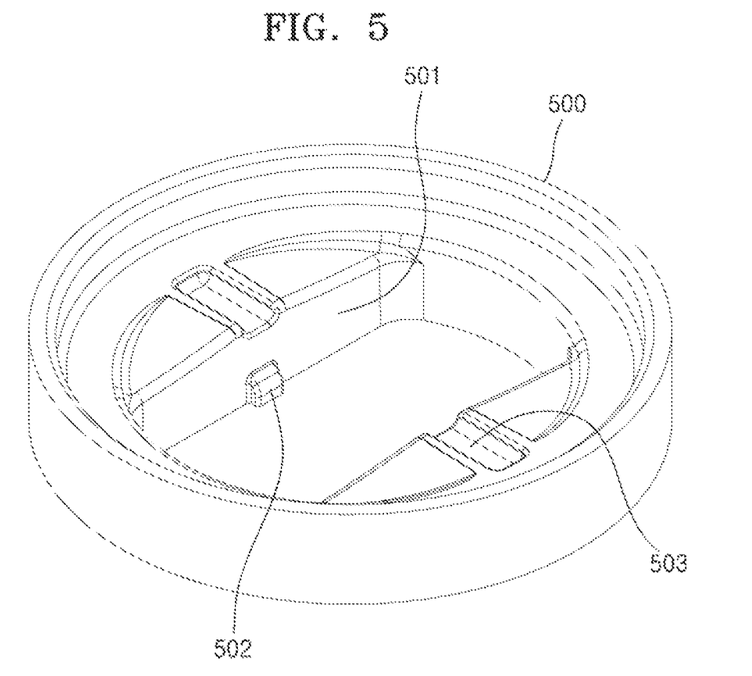
FIG. 5 is a perspective view illustrating a first member according to an embodiment of the present disclosure.
Figure 6:
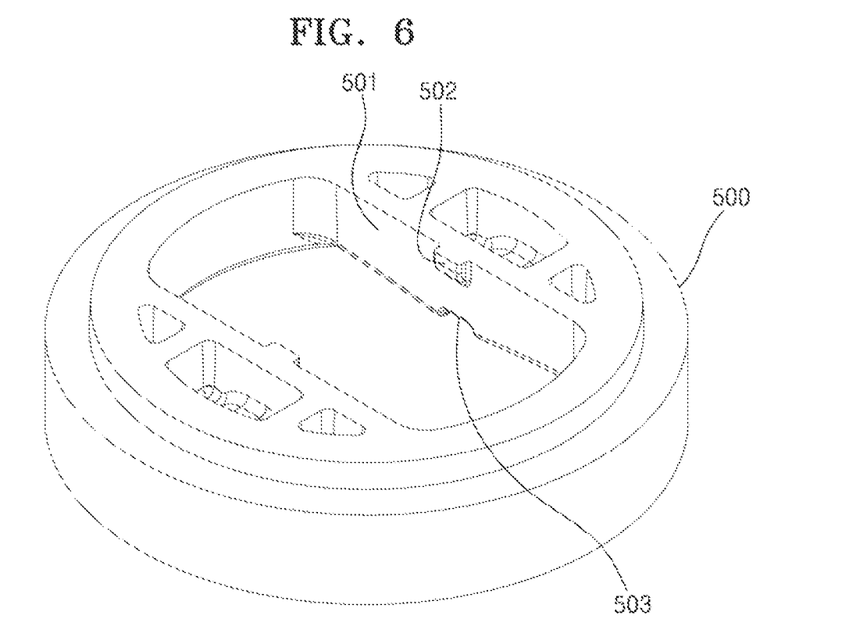
FIG. 6 is a perspective view in an oblique upward direction from the lower side in FIG. 5.

As shown in FIGS. 5 and 6, the first hole 501 is formed in the first member 500 such that a shaft 200 may be inserted into the first member 500. The first hole 501 has a long hole shape, and an engaging protrusion 502 is provided on the inner surface of the first hole 501. The engaging protrusion 502 is fitted into a vertical groove and a horizontal groove of the shaft 200 and protrudes from a rear side (based on FIG. 5) of the first member 500. Specifically, the engaging protrusion 502 protrudes toward the inside of the first hole 501.

An anti-loosening groove 503 is provided in a peripheral region of the first hole 501, and an anti-loosening structure 320 provided on the stopper 300 of the shaft 200 may be fitted and trapped in the anti-loosening groove 503. The anti-loosening groove 503 is provided in the periphery region of the first hole 501 in an upper side (based on FIG. 5) of the first member 500. After the shaft 200 is rotated to a final coupling position (the position shown in FIGS. 16 to 18), the anti-loosening structure 320 of the stopper 300 is fitted into the anti-loosening groove 503 such that a final coupling state may be maintained.

The second member 600 corresponds to a door inner panel, and the second hole 601 is formed in the second member 600 at a position corresponding to the first hole 501 of the first member 500. The second hole 601 has a long hole shape substantially corresponding to a crossbar 400.

The vehicle door coupling device 100 includes the shaft 200, the stopper 300, and the crossbar 400.

Figure 4:
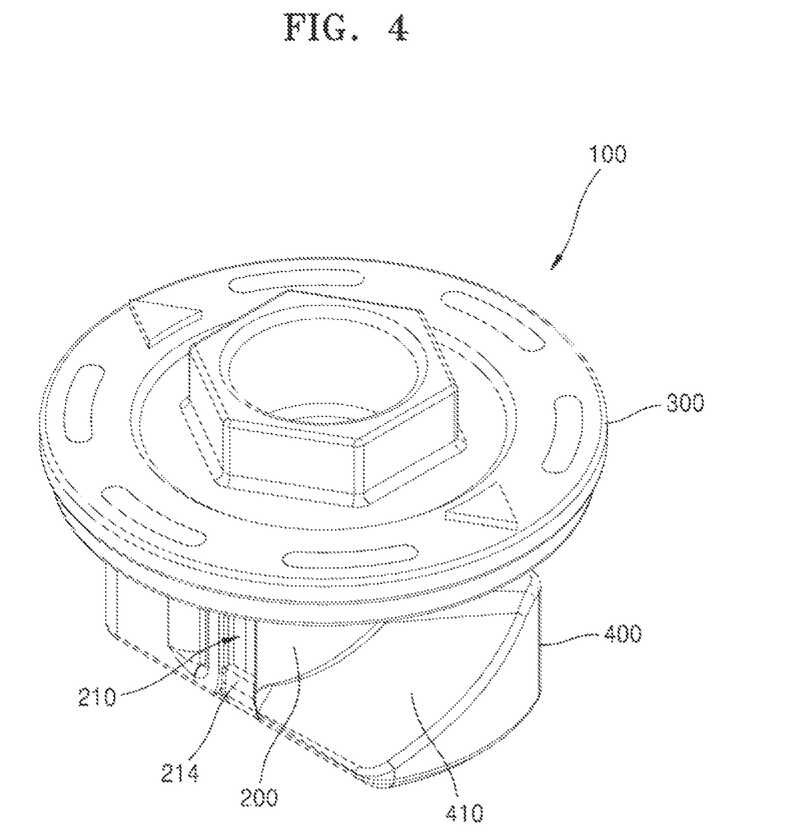
FIG. 4 is a perspective view in an oblique upward direction from the lower side in FIG. 3.

The shaft 200 has a vertically extending pillar shape such that the shaft 200 may be rotatably fitted into the first hole 501 of the first member 500 and the second hole 601 of the second member 600 and may rotatably pass therethrough. The stopper 300 is provided on the upper end of the shaft 200, and the crossbar 400 is formed on the lower end of the shaft 200. (The terms "upper end" and "lower end" are given based on FIG. 4 for ease of illustration.)

A position maintaining structure 210 is provided on the shaft 200. Owing to the position maintaining structure 210, the shaft 200 may be temporarily coupled to the first member 500 in a vertically movable manner without being separated from the first member 500 in a temporary coupling position (the position shown in FIGS. 4 to 12), and the state in which a rear side of the crossbar 400 partially protrudes from the second member 600 may be maintained in the temporary coupling position.

Specifically, the position maintaining structure 210 includes: a vertical groove portion 211 which is provided in an outer side of the shaft 200 and vertically extends toward an end of the shaft 200 from the other end of the shaft 200 to receive the engaging protrusion 502 therein and guide the engaging protrusion 502; and a horizontal groove portion 212 which horizontally extends from an end portion of the vertical groove portion 211 to allow rotation of the shaft 200, wherein the vertical groove portion 211 is provided with a position maintaining protrusion 213 which prevents the engaging protrusion 502 of the first hole 501 from entering the horizontal groove portion 212 in the temporary coupling position. Specifically, the positioning protrusion 213 may be provided on a portion through which the vertical groove portion 211 and the horizontal groove portion 212 are connected to each other.

In addition, a separation-preventing protrusion 214 is provided on an upper entrance of the vertical groove portion 211, and thus, the engaging protrusion 502 inserted into the vertical groove portion 211 is prevented from being separated from the vertical groove portion 211 by the separation-preventing protrusion 214. The engaging protrusion 502 allows upward or downward movement of the shaft 200 in the temporary coupling position while the engaging protrusion 502 moves upward or downward between the separation-preventing protrusion 214 and the position maintaining protrusion 213.

Specifically, when the shaft 200 enters the first hole 501 of the first member 500, the engaging protrusion 502 of the first member 500 is inserted into the vertical groove portion 211 while being moved over the separation-preventing protrusion 214. In this case, the vertical groove portion 211 prevents the engaging protrusion 502 from moving left and right, thereby preventing the shaft 200 from rotating relative to the first member 500. In other words, the vertical groove portion 211 has a function of guiding the movement of the engaging protrusion 502.

In addition, the engaging protrusion 502 having entered the vertical groove portion 211 may move up to the position maintaining protrusion 213, and in the temporary coupling position, the engaging protrusion 502 may move between the separation-preventing protrusion 214 and the position maintaining protrusion 213. Therefore, the shaft 200 may be vertically moved by a predetermined distance in the temporary coupling position. Therefore, when a worker puts the second member 600 on the rear side of the first member 500 in the temporary coupling position, interference caused by the crossbar 400 of the shaft 200 may be minimized. Especially, the crossbar 400 of the shaft 200 is configured to be freely moved in an axial direction by a distance of about 3 mm to about 6.5 mm from the rear side of the first member 500 in the temporary coupling position, and thus, the crossbar 400 of the shaft 200 may minimally obstruct the movement of the first member 500 to the second member 600.

The horizontal groove portion 212 is provided with a rotation-suppressing protrusion 215 for suppressing the rotation of the shaft 200, and thus, the rotation of the shaft 200 is prevented unless a force equal to or greater than a given value is applied to the shaft 200 after the engaging protrusion 502 enters the horizontal groove portion 212.

Specifically, if the engaging protrusion 502, of which left and right rotation in the vertical groove portion 211 is suppressed, is allowed to rotate immediately after the engaging protrusion 502 is vertically moved downward into the horizontal groove portion 212, the second member 600 may be fixed to the first member 500 due to an unintended rotation of the shaft 200, and thus, the rotation-suppressing protrusion 215 is provided to prevent this. Until a sufficient amount of force for moving over the rotation-suppressing protrusion 215 is applied, the rotation of the shaft 200 is suppressed.

The stopper 300, which is provided on a side of the shaft 200 for supporting the first member 500, is located on an upper side of the shaft 200. The stopper 300 has a disk shape and is configured such that the lower surface of the stopper 300 presses the upper surface of the first member 500 in the final coupling position while making contact with the upper surface of the first member 500.

Specifically, as the lower surface of the stopper 300 makes contact with the upper surface of the first member 500, the stopper 300 supports the first member 500.

The stopper 300 has a rear side which faces the first member 500, and a sealing material 301 is provided on the rear side of the stopper 300 to guarantee watertightness when the stopper 300 makes contact with the first member 500. Specifically, the sealing material 310 may be a rubber material having a ring shape and configured to provide watertight sealing along the periphery of the first hole 501 of the first member 500.

In addition, the anti-loosening structure 320 is provided on the stopper 300 to prevent the shaft 200 from loosening after being rotated to the final coupling position. The anti-loosening structure 320 is a protrusion protruding from the rear side of the stopper 300 and configured to be fitted into the anti-loosening groove 503 of the first member 500. When the shaft 200 is rotated to the final coupling position, the anti-loosening structure 320 is inserted into the anti-loosening groove 503 of the first member 500, thereby fixing the shaft 200 in the final coupling position.

The crossbar 400 is provided on the other side of the shaft 200, and when the shaft 200 is rotated to the final coupling position, the crossbar 400 supports the second member 600 and fixes the second member 600 to the first member 500. The crossbar 400 is located on the lower end of the shaft 200 and generally has a horizontally extending bar shape.

An inclined surface 410 is formed on an upper surface of the crossbar 400, and when the shaft 200 is rotated in one direction, the distance between the first member 500 and the second member 600 is reduced owing to the inclined surface 410. That is, the thickness of the crossbar 400 increases along the inclined surface 410 such that when the shaft 200 is rotated, the distance between the first member 500 and the second member 600 may be reduced along the inclined surface 410. In the temporary coupling position, the crossbar 400 does not protrude from the rear side of the first member 500 which faces the second member 600, and thus, when the second member 600 is coupled to the first member 500 while bringing the second member 600 into contact with the rear side of the first member 500, the crossbar 400 does not interfere with the first member 500.

The vehicle door coupling device 100 of the present disclosure will now be described in more detail with reference to the accompanying drawings.

Figure 7:
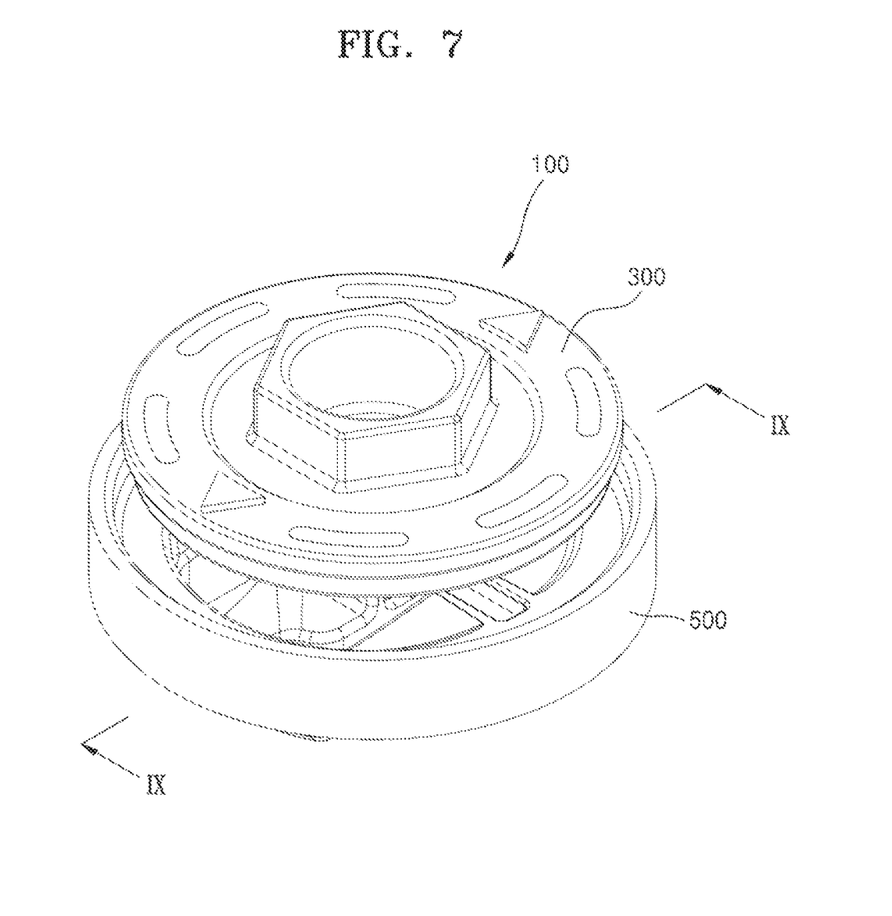
FIG. 7 is a perspective view illustrating the vehicle door coupling device in a temporary coupling position.
Figure 8:
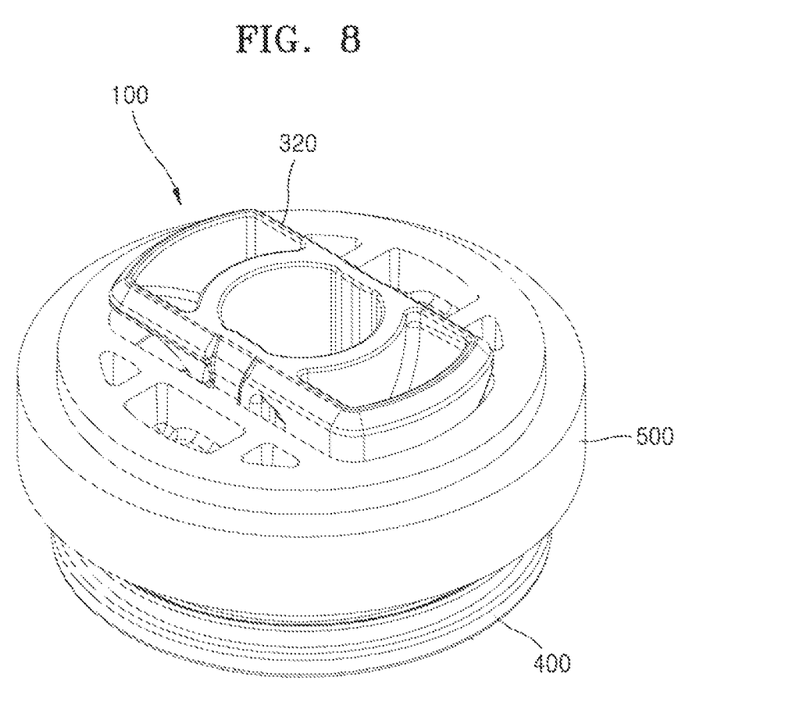
FIG. 8 is a perspective view illustrating the vehicle door coupling device from the lower side in FIG. 7.
Figure 9:
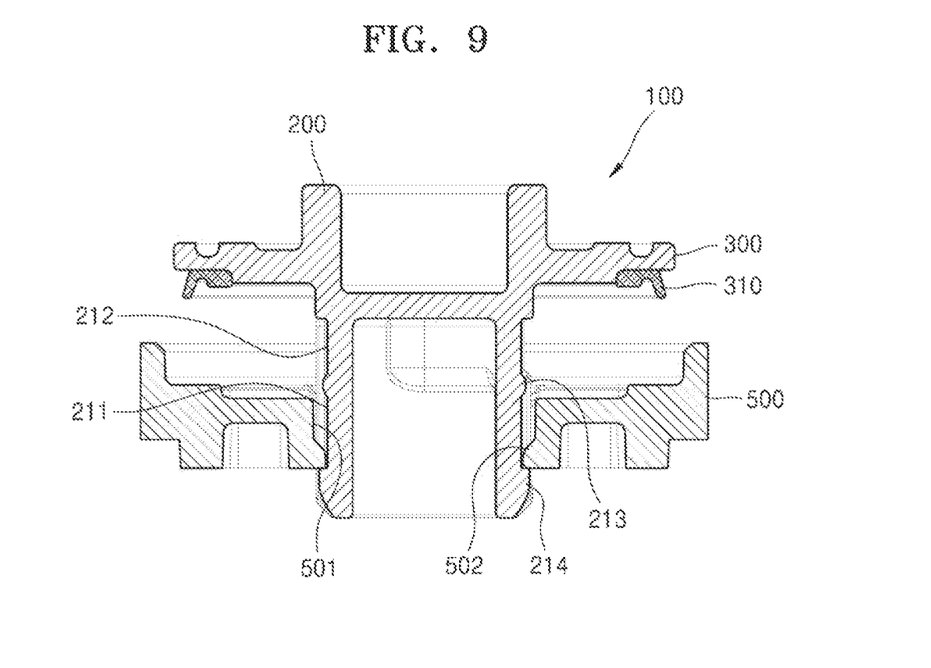
FIG. 9 is a cross-sectional view taken along line IX-IX of FIG. 7.

FIGS. 7 to 9 are views illustrating a state in which the shaft 200 is temporarily coupled to the first member 500.

While a door module is moved toward a door in a state in which necessary electric components (not shown) are installed on the door module, the shaft 200 is coupled to the first member 500. Therefore, additional fastening means (such as bolts) for installing the first member 500 on the door may not be necessary.

In such a temporary state, the crossbar 400 to be supported by the second member 600 is placed in the first member 500 with an end of the crossbar 400 protruding from the first member 500 by about 3 mm as shown in FIG. 8, and thus when the first member 500 is moved toward the second member 600, the shaft 200 does not act as an additional obstacle.

Moreover, because the crossbar 400 slightly protrudes, the first member 500 may be easily put in place. That is, the crossbar 400, which protrudes from the rear side of the first member 500 by about 3 mm, may not act as an obstacle but may facilitate position alignment while the first member 500 is moved to the second member 600.

Figure 10:
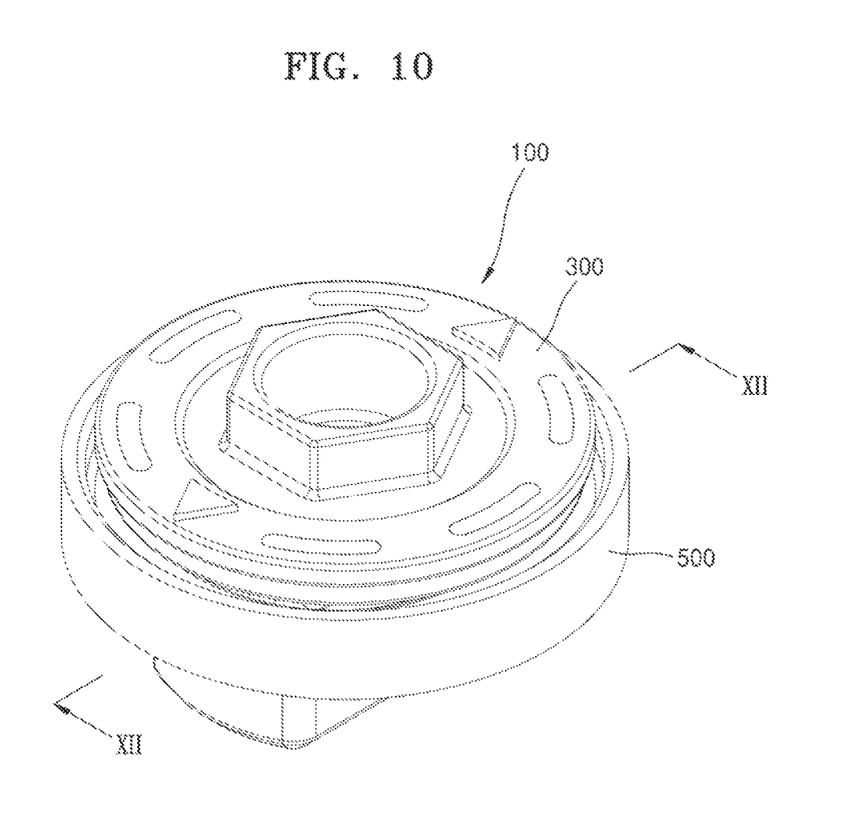
FIG. 10 is a perspective view illustrating the vehicle door coupling device when a shaft is lowered from the state shown in FIG. 7.
Figure 11:
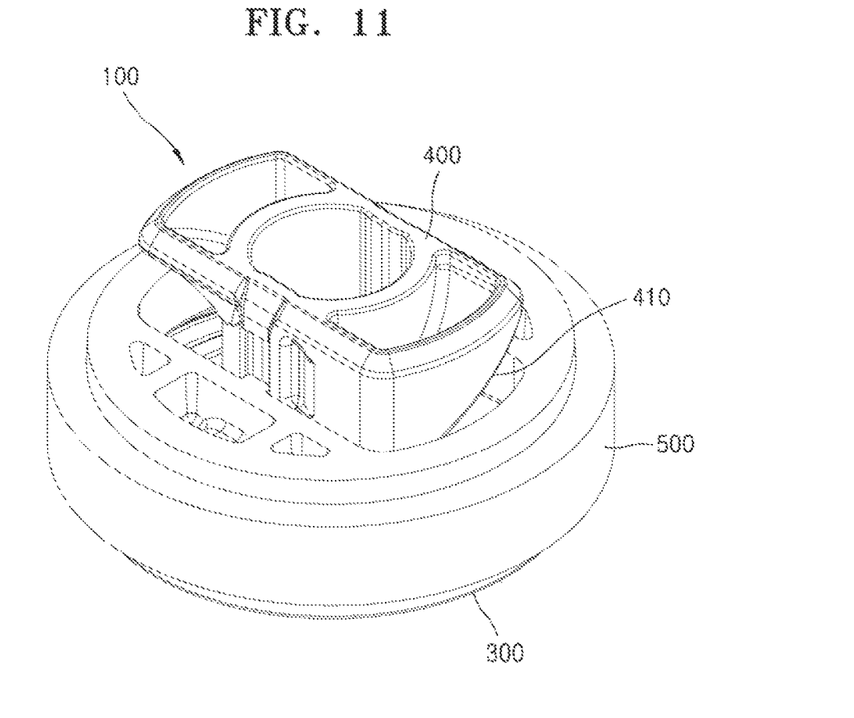
FIG. 11 is a perspective view illustrating the vehicle door coupling device from the lower side in FIG. 10.
Figure 12:
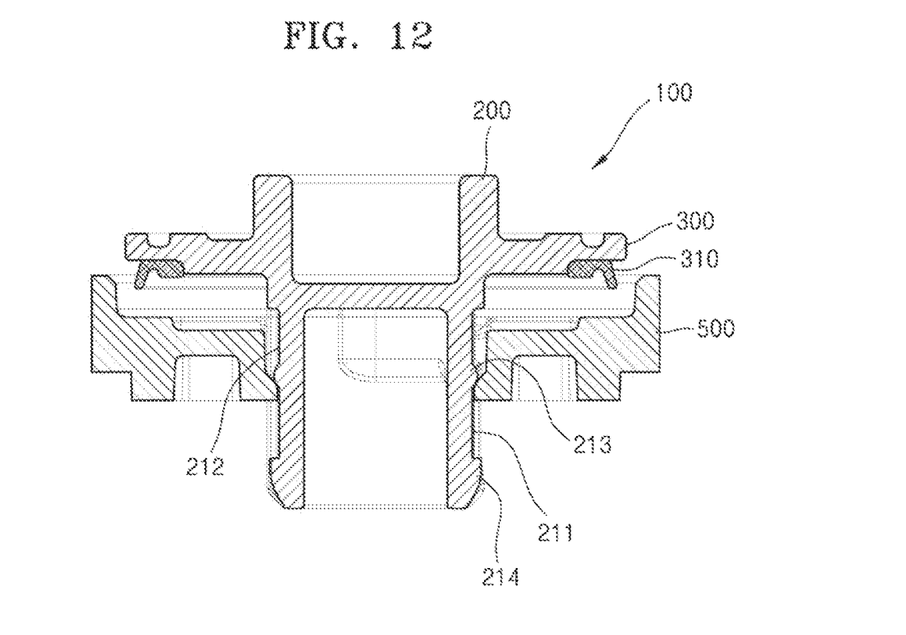
FIG. 12 is a cross-sectional view taken along line XII-XII of FIG. 10.

FIGS. 10 to 12 illustrate a state in which the shaft 200 is moved downward while being maintained in the temporary coupling position. Specifically, the state in which the shaft 200 is moved downward is a preliminary state before the final coupling position. Referring to FIG. 10 in comparison with FIG. 7, the shaft 200 is moved downward through the upper end of the first member 500. Specifically, the shaft 200 is moved downward until the engaging protrusion 502 reaches the position maintaining protrusion 213 in a state in which the engaging protrusion 502 is still in the vertical groove portion 211. At this time, the crossbar 400 of the shaft 200 may protrude by about 6.5 mm.

As described above, the shaft 200 of the present disclosure is configured such that the crossbar 400 may be vertically movable within the range of 3 mm to 6.5 mm from the rear side of the second member 600.

In addition, because the engaging protrusion 502 of the first member 500 is in the vertical groove portion 211, the shaft 200 is movable only in the vertical direction in a state in which the rotation of the shaft 200 is restricted.

Figure 13:
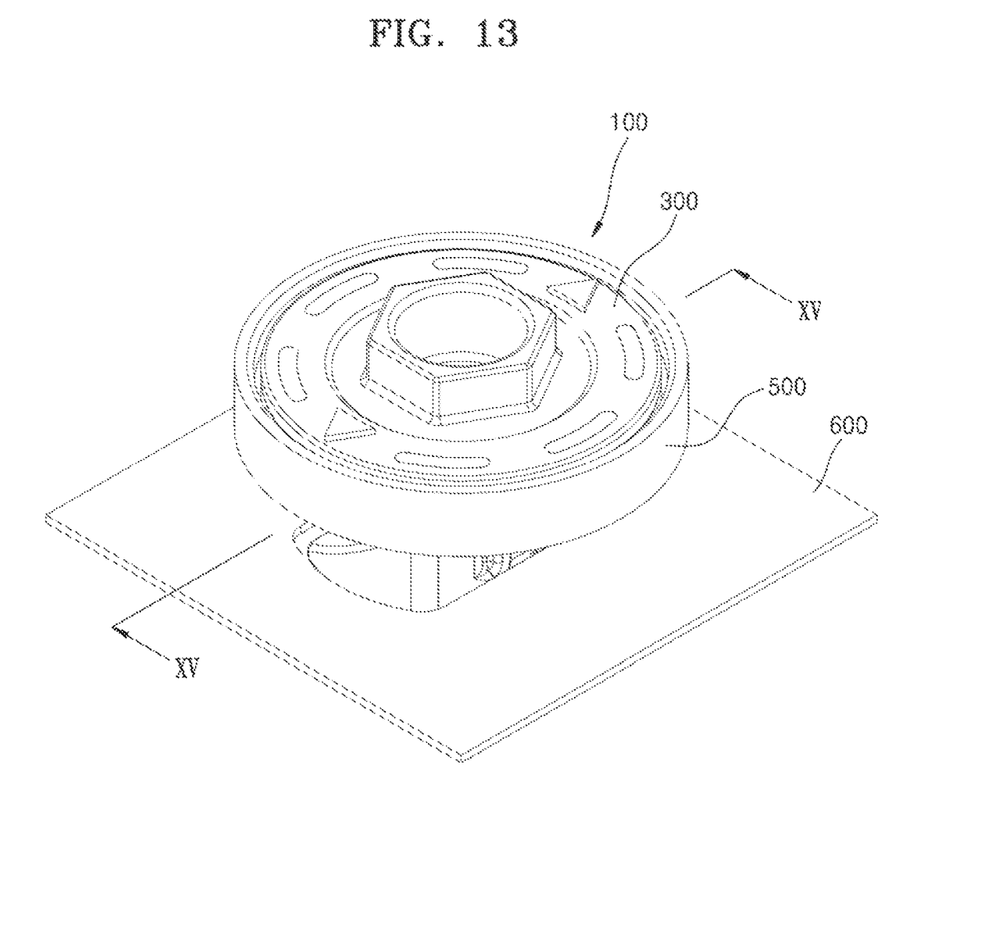
FIG. 13 is a perspective view illustrating a state in which the shaft is inserted into a second member and a crossbar protrudes from the second member.
Figure 14:
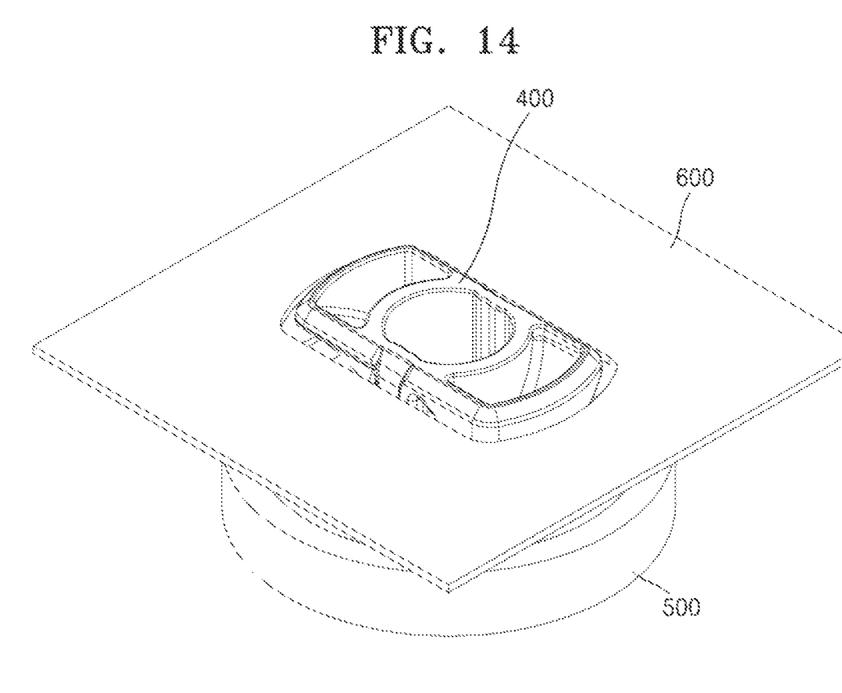
FIG. 14 is a perspective view illustrating the vehicle door coupling device from the lower side in FIG. 13.
Figure 15:
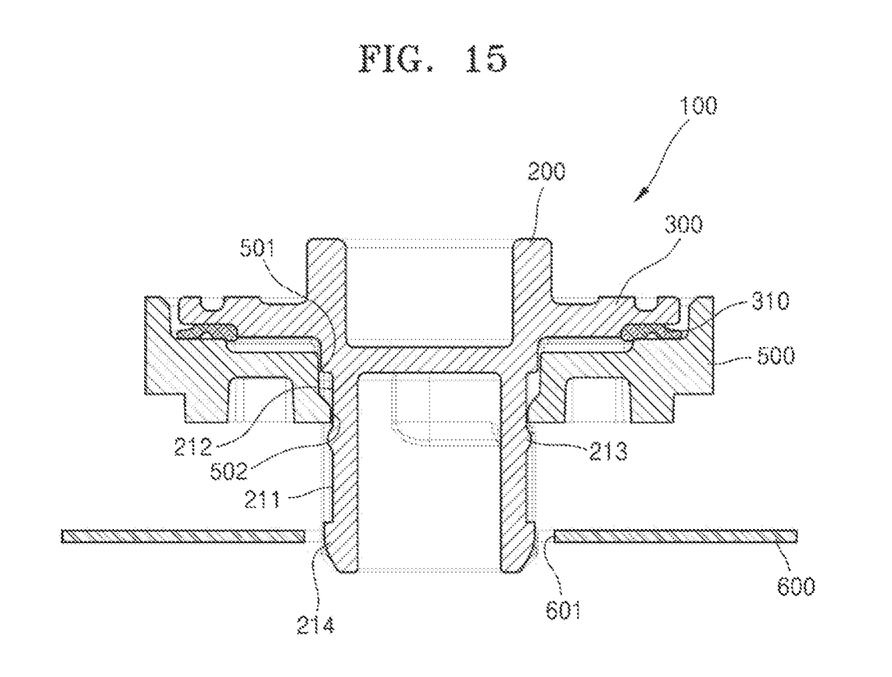
FIG. 15 is a cross-sectional view taken along line XV-XV of FIG. 10.

FIGS. 13 to 15 illustrate a state in which the crossbar 400 is inserted into the second hole 601 of the second member 600. Because the crossbar 400 is in a protruding state as described above, the crossbar 400 may be easily aligned with the second hole 601 of the second member 600. That is, the crossbar 400 is not easily aligned with the second hole 601 of the second member 600 if the crossbar 400 is kept inside the first member 500 and does not protrude from the first member 500.

In this case, the second member 600 is spaced apart from the first member 500, and the first hole 501 of the first member 500 and the second hole 601 of the second member 600 are aligned with each other. In this state, the crossbar 400 may be moved to the final coupling position shown in FIGS. 16 to 18 by rotating the crossbar 400.

Figure 16:
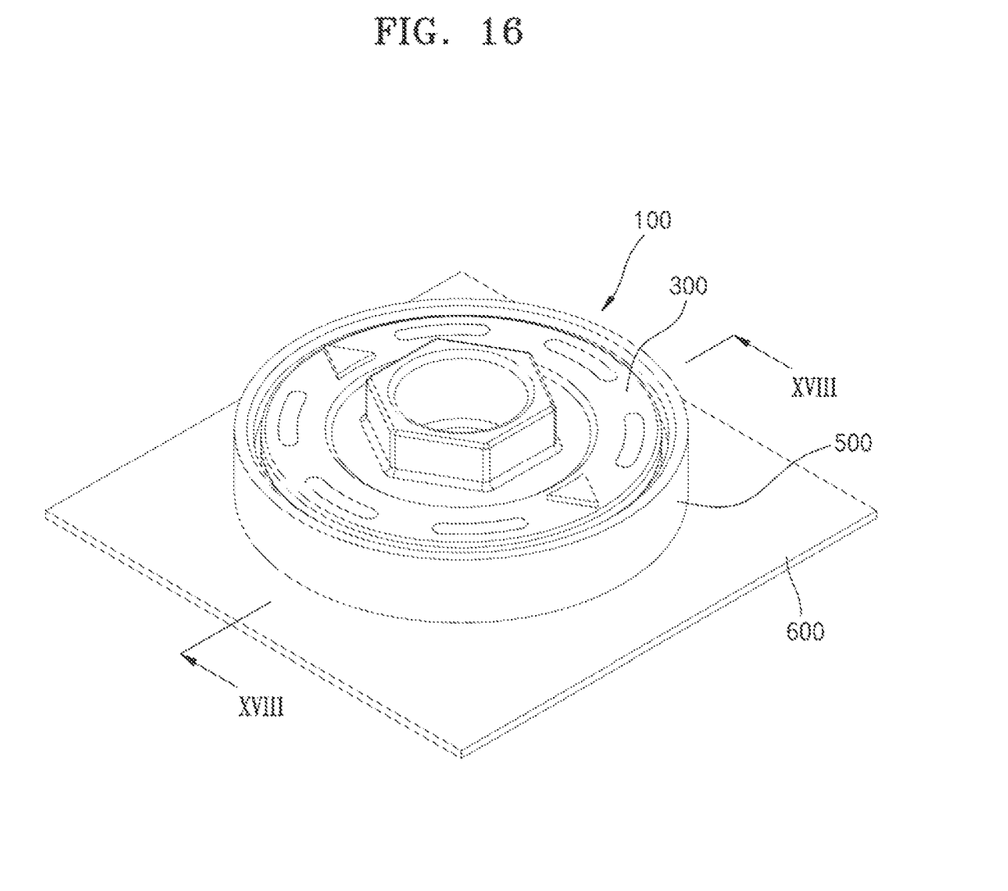
FIG. 16 is a perspective view illustrating the vehicle door coupling device in a final coupling position.
Figure 17:
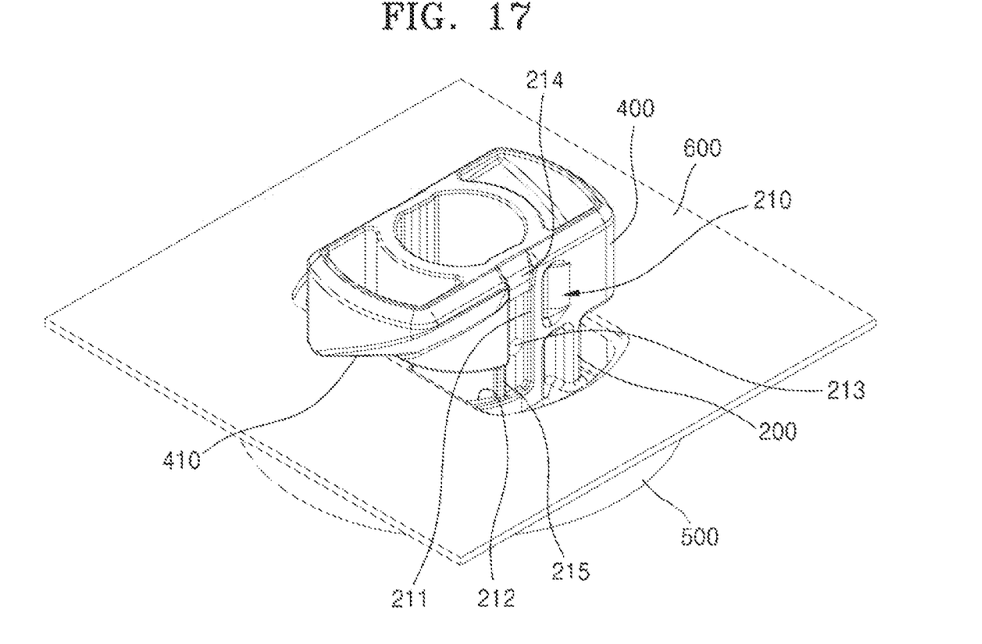
FIG. 17 is a perspective view from the lower side in FIG. 16.
Figure 18:
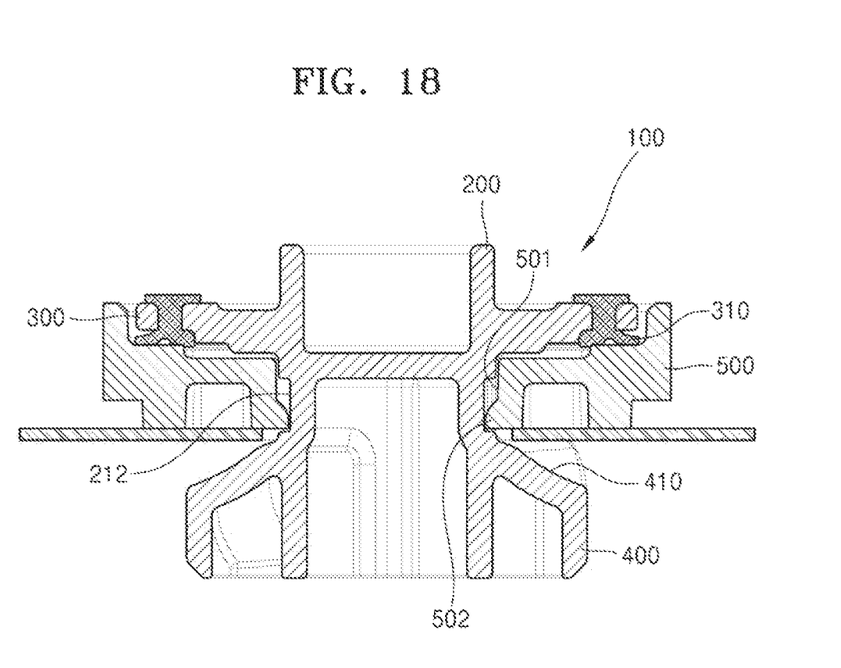
FIG. 18 is a cross-sectional view taken along line XVIII-XVIII of FIG. 16.

FIGS. 16 to 18 illustrate the final coupling position. When the shaft 200 is rotated by 90° or more, the stopper 300 supports the first member 500, and the upper surface of the crossbar 400 supports the lower surface of the second member 600, such that the first member 500 and the second member 600 may be clamped to each other That is, as shown in FIG. 18, the first member 500 and the second member 600 may be securely coupled to each other in a state in which the stopper 300 supports the first member 500 and the crossbar 400 supports the second member 600. In this case, the anti-loosening structure 320 suppresses reverse rotation of the shaft 200, and thus, the clamping between the first member 500 and the second member 600 is maintained.

In addition, because the sealing material 310 of the stopper 300 is in close contact with the surface of the first member 500, permeation of water between the first member 500 and the stopper 300 may be prevented, and the inside of the door may be securely kept in a watertight state.

The vehicle door coupling device of the present disclosure has the following effects.

According to the present disclosure, in a state in which the vehicle door coupling device is temporarily fitted into a door modular panel, the vehicle door coupling device may be simply and fixedly inserted into a door inner panel, such that the door modular panel and the door inner panel may be easily coupled to each other.

In addition, because the vehicle door coupling device of the present disclosure is provided with the sealing material on the shaft, the gap between the shaft and the door modular panel may be securely sealed, and thus, a watertight space may be easily formed in the door.

Furthermore, in the temporary coupling position, the crossbar is freely movable in a vertical direction within the range of 3 mm to 6.5 mm, and thus the crossbar may not act as a significant obstacle when the door inner panel and the door modular panel are coupled to each other.

Furthermore, in the temporary coupling position, the engaging protrusion is guided in the vertical groove portion only in the vertical direction, and thus, the rotation of the shaft may be securely prevented. However, if the vertical groove portion is not provided, the shaft may be rotated even in a state in which the shaft is partially inserted, that is, the shaft may be unintendedly rotated before the shaft is fully inserted. This problem may be solved by the present disclosure.

In addition, according to the present disclosure, owing to the rotation-suppressing protrusion provided on the horizontal groove portion, unintended rotation of the shaft in the horizontal groove portion may be prevented.

In addition, according to the present disclosure, the anti-loosening structure is configured to be trapped in the loosening groove at a completely fastened position, and thus, loosening (reverse rotation) may be prevented after complete fastening.

While the vehicle door coupling device of the present disclosure has been described with reference to various embodiments, the vehicle door coupling device is not limited to the embodiments, and it will be apparent that anything that can be reasonably interpreted from the scope of the present disclosure is included in the scope of the present disclosure.

The invention claimed is:

1. A vehicle door coupling device for mechanically coupling together a first member having a first hole inside which an engaging protrusion is provided and a second member having a second hole at a position corresponding to the first hole, the vehicle door coupling device comprising:
   a shaft shaped to be fitted into the first hole of the first member and the second hole of the second member and rotatably pass therethrough, the shaft extending in a vertical direction;
   a stopper provided on a first side of the shaft and configured to support the first member;
   a crossbar provided a second side of the shaft and configured such that when the shaft is rotated to a final coupling position, the crossbar fixedly couples the second member to the first member while supporting the second member; and a position maintaining structure provided on the shaft, the position maintaining structure being configured to allow the shaft to be temporarily coupled to the first member in a temporary coupling position in a state in which the shaft is vertically movable without being separated from the first member and being configured to maintain a state in which a rear side of the crossbar partially protrudes from the second member in the temporary coupling position, wherein the position maintaining structure comprises:

a vertical groove portion which is provided in an outer side of the shaft, extends in the vertical direction toward the first side of the shaft from the second side of the shaft, and is configured to receive the engaging protrusion therein and guide the engaging protrusion; and a horizontal groove portion which extends in a horizontal direction from an end of the vertical groove portion and is configured to allow rotation of the shaft, wherein a position maintaining protrusion is provided in the vertical groove portion to prevent the engaging protrusion of the first hole from entering the horizontal groove portion in the temporary coupling position.

2. The vehicle door coupling device of claim 1, wherein the position maintaining protrusion is provided on a portion through which the vertical groove portion and the horizontal groove portion are connected to each other.

3. The vehicle door coupling device of claim 2, wherein a separation-preventing protrusion is provided on an entrance of the vertical groove portion to prevent separation of the engaging protrusion inserted into the vertical groove portion, and the engaging protrusion allows the shaft to move upward or downward in the temporary coupling position while the engaging protrusion vertically moves between the separation-preventing protrusion and the position maintaining protrusion.

4. The vehicle door coupling device of claim 1, wherein a rotation-suppressing protrusion is provided in the horizontal groove portion to suppress rotation of the shaft such that unless a force equal to or greater than a given value is applied to the shaft, rotation of the shaft along the horizontal groove portion is suppressed.

5. The vehicle door coupling device of claim 1, wherein the stopper of the shaft has a rear side facing the first member, and a sealing material is provided on the rear side to guarantee watertightness when the stopper is brought into contact with the first member.

6. The vehicle door coupling device of claim 1, wherein an anti-loosening structure is provided on the stopper of the shaft to prevent loosening when the shaft is rotated to the final coupling position.

* * * * *